United States Patent [19]

Bolzani et al.

[11] Patent Number: 4,821,632

[45] Date of Patent: Apr. 18, 1989

[54] APPARATUS FOR AUTOMATICALLY COOKING ALIMENTARY PASTA

[76] Inventors: Otello Bolzani, Via Mantova, 79; Alcide Iotti, Via Torreggiani, 5, both of 43100 Parma, Italy

[21] Appl. No.: 94,340

[22] Filed: Sep. 8, 1987

[30] Foreign Application Priority Data

Sep. 10, 1986 [IT] Italy .................... 21664 A/86

[51] Int. Cl.⁴ .................................. A47J 27/00
[52] U.S. Cl. ........................... 99/330; 99/407; 99/413; 426/509
[58] Field of Search .............. 99/330, 331, 403, 407, 99/408, 409, 413, 416; 426/509

[56] References Cited

U.S. PATENT DOCUMENTS

| | | |
|---|---|---|
| 3,332,338 | 7/1967 | Wein .................... 99/331 |
| 3,501,316 | 3/1970 | Guthrie .................. 99/407 |
| 4,084,492 | 4/1978 | Sullivan ................. 99/407 |
| 4,619,189 | 10/1986 | Kou ...................... 99/407 |

FOREIGN PATENT DOCUMENTS

| | | |
|---|---|---|
| 3767 | of 1905 | Australia ............... 99/413 |
| 13887 | 9/1900 | United Kingdom ........ 99/413 |

*Primary Examiner*—George Yeung
*Attorney, Agent, or Firm*—Bucknam and Archer

[57] ABSTRACT

An apparatus for automatically cooking pasta, comprising a basin in which a pasta basket is removably housed, the pasta basket being rotatably supported by a cover adapted to be tightly engaged on a side of the basin, a duct for introducing hot water into the basin, the hot water introducing duct being controlled by a first valve arranged on a delivery side of a first pump drawing water from a boiler, a water recirculation duct connected to the delivery side of the first pump and controlled by a second valve for recirculating water between a kettle and the boiler, a further duct connected to the kettle and controlled by a third valve for supplying preheated water from a heat exchanger to the kettle and the boiler, an accumulating tank for introducing the water existing the basin into the heat exchanger, and a basin recirculating circuit consisting of a second pump and a further heat exchanger.

1 Claim, 4 Drawing Sheets

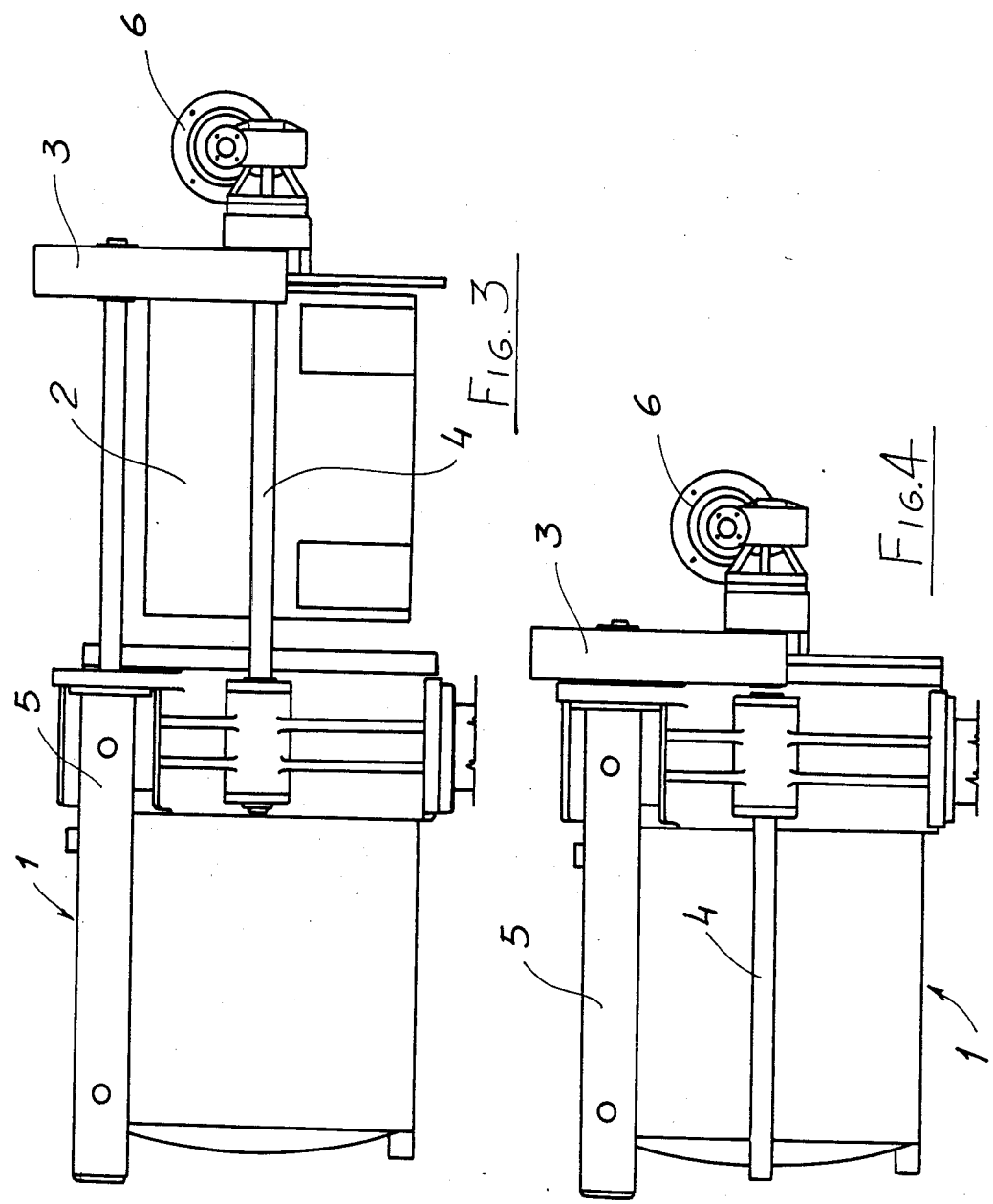

APPARATUS FOR AUTOMATICALLY COOKING ALIMENTARY PASTA

BACKGROUND OF THE INVENTION

The present invention relates to a method and apparatus for automatically cooking alimentary pasta.

As is known, several types of pasta cooking apparatus are presently available for automatically cooking pasta for the use in restaurants, refectories and the like.

These known apparatus essentially comprise a basin housing a removable basket for cooking pasta.

Hot water is supplied to the basin, generally at a controlled temperature, and then the pasta to be cooked and a given amount of salt are added.

At the end of the cooking cycle and after having removed the cooked pasta, a portion of the cooking water is discharged, and a new amount of cold water is added as well as a salt amount nearly corresponding to that previously discharged with the hot water.

This water addition, without discharging all of the used water, is due to the fact that it would not be advantageous to waste the complete thermal power of the used water: thus, by discharging only a portion of the used water, a portion of this thermal power will be preserved.

This procedure, however, is disadvantageous for the cooking cycle since the salt amount to be added may be hardly evaluated; moreover the pasta, in the subsequent cooking cycles is practically cooked in a liquid in which there are dissolved great amounts of the pasta soluble products, deriving from the previous cooking cycles.

Another drawback is that the thermal energy of the discharged water is completely lost with a comparatively great thermal waste.

SUMMARY OF THE INVENTION

Thus, the main object of the present invention is to overcome the above mentioned drawbacks, by providing a method for cooking alimentary pasta in which the pasta may be cooked, in all of the subsequent cooking cycles, with suitably salted new water, while preserving the thermal power or energy of the water used in the previous cooking cycles.

Another object of the present invention is to provide an alimentary pasta cooking apparatus which affords the possibility of perfectly cooking pasta as well as of stopping the cooking at the desired time, by introducing cold water.

Another object of the present invention is to provide a method for automatically cooking pasta which may be carried out in a simple way by using a structurally very simple and reliable cooking apparatus.

Yet another object of the present invention is to provide a pasta cooking apparatus which may be easily constructed starting from easily available materials and which has a comparatively low cost.

Yet another object of the present invention is to provide a pasta cooking apparatus which is effective to prevent steam from escaping into the environment, as it occurs in conventional pasta cooking apparatus.

According to one aspect of the present invention, the above mentioned objects, as well as yet other objects, which will become more apparent thereinafter, are achieved by a method for automatically cooking pasta, characterized in that it comprises the steps of: filling in a basket the pasta to be cooked and a given salt amount; introducing the basket into a cooking basin; introducing into the basin hot water derived from a boiler; circulating the cooking water at a controlled temperature; removing, at the expiring of the cooking time, the cooking water from the basin sending it to an accumulating tank therefrom it will discharged through a heat exchanger adapted to preheat the water system water to be supplied to the boiler; introducing cold water into the basin in order to stop the pasta cooking; discharging the cold water from the basin and removing the basket therefrom.

BRIEF DESCRIPTION OF THE DRAWINGS

Further characteristics and advantages of the invention will become more apparent thereinafter from the following disclosure of a method and apparatus for automatically cooking pasta, with reference to the accompanying drawings, where:

FIG. 3 is a front elevation view illustrating the basin with the basket removed therefrom;

FIG. 4 is another elevation view illustrating the basin with the basket housed therein.

DESCRIPTION OF THE PREFERRED EMBODIMENT

Figure 1:
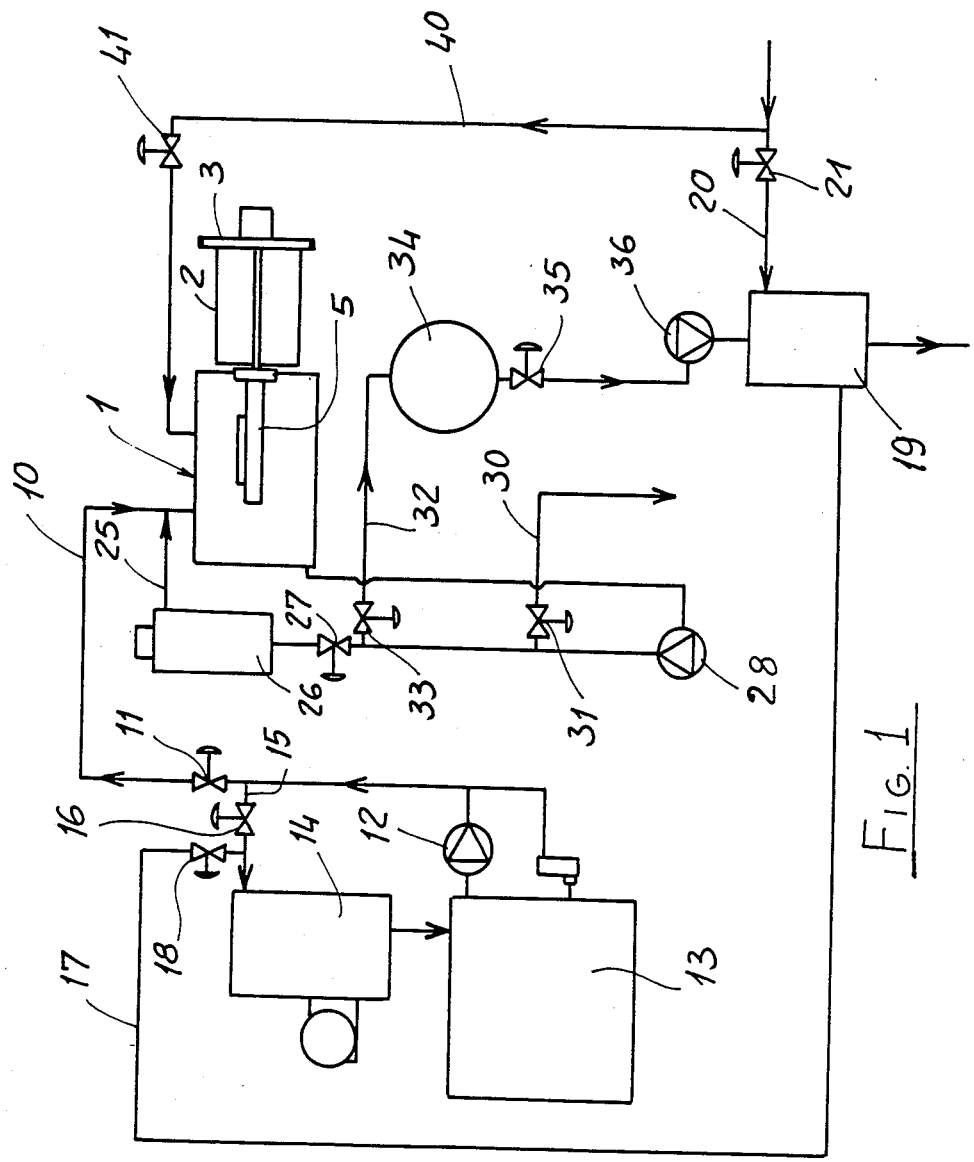
FIG. 1 illustrates a schematic diagram of the pasta cooking apparatus according to the present invention.
Figure 2:
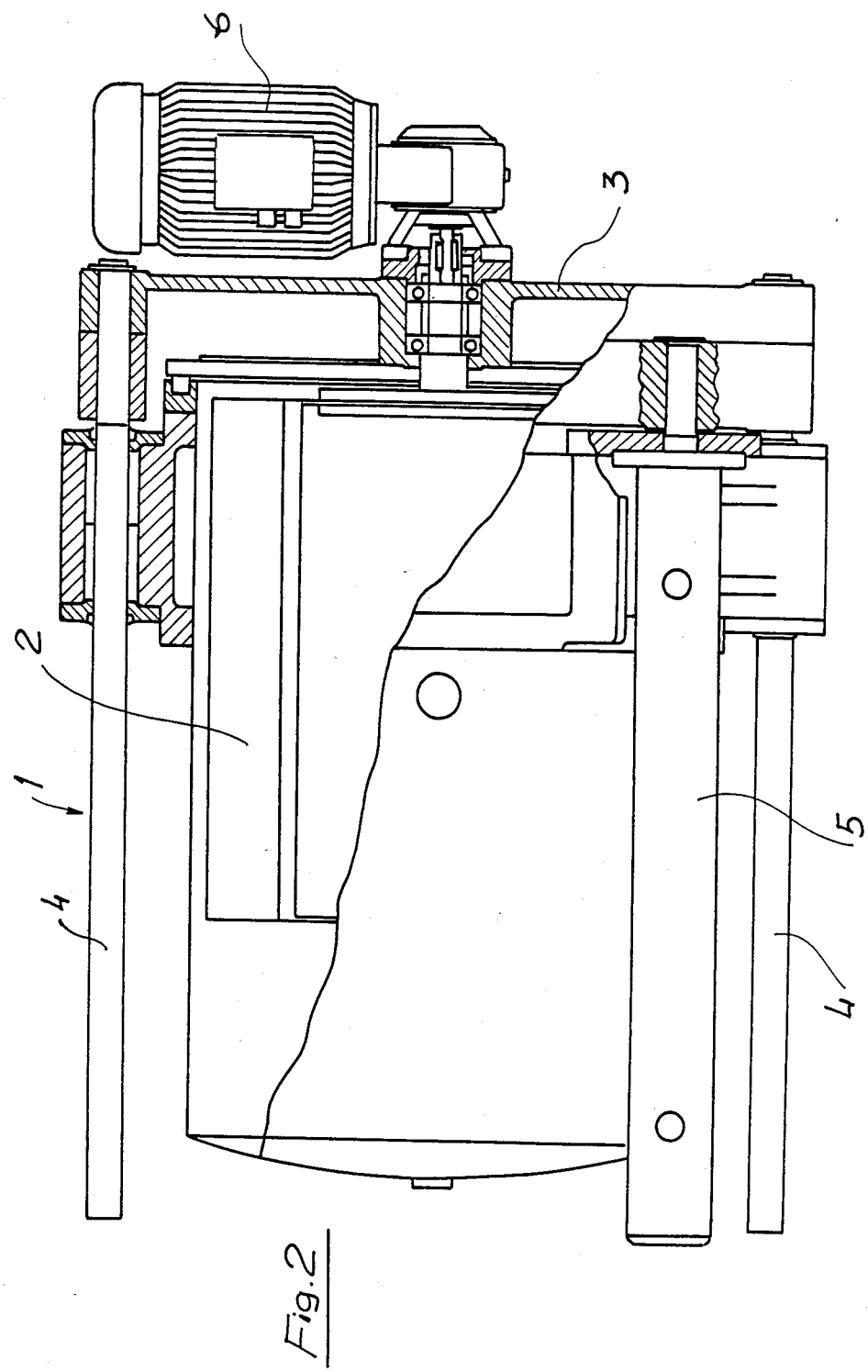
FIG. 2 is a plan partially broken view illustrating the pasta cooking basin and related basket.
Figure 5:
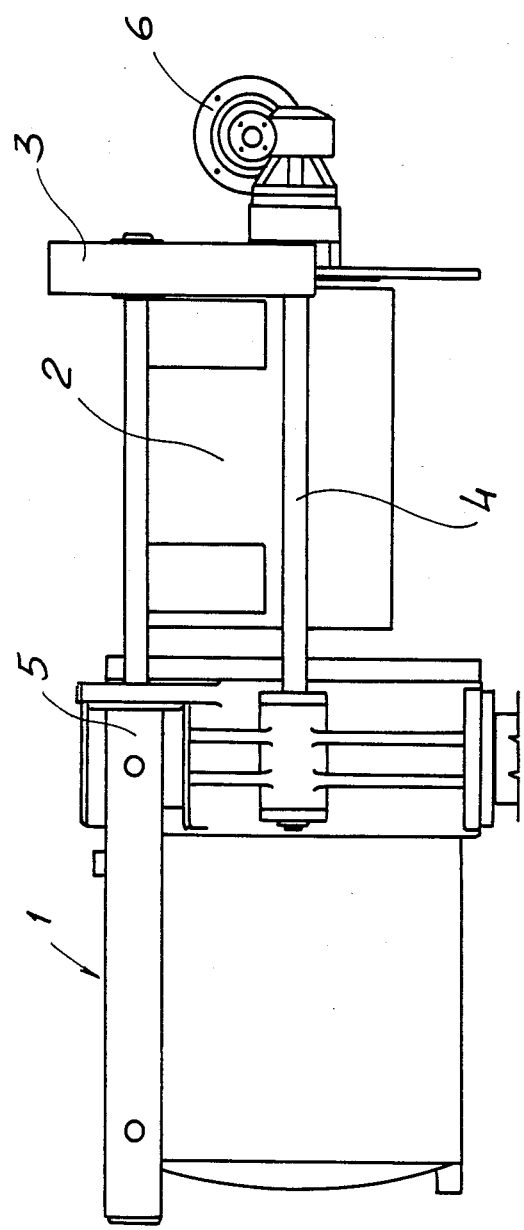
FIG. 5 illustrates the pasta cooking basin with the basket withdrawn and in a tilted position ready for discharging the cooked pasta.

With reference to the drawing figures, the apparatus for automatically cooking alimentary pasta according to the present invention essentially comprises a pasta cooking basin, indicated overally at the reference number 1, in the inside of which there is housed a tiltable basket 2, which is associated with a cover 3, to be applied on the cooking basin side and adapted to be displaced on guiding rods 4 by means of pistons 5, in order to remove the basket from one side of the apparatus.

To the cover 3 a geared motor unit 6 is coupled for rotating the basket for carrying out the pasta loading and unloading steps.

To the top portion of the basin 1 leads a duct 10 for the inlet of the hot water, which is controlled by a first valve 11 arranged on the delivery side of a first pump 12, communicating with a boiler 13, thereto water is supplied from a kettle 14.

A water recirculation duct 15 is moreover provided, which is controlled by a second valve 16 which is specifically designed for reintroducing into the kettle the water supplied by the pump 12, as it will be disclosed in a more detailed may therein after.

With the recirculation duct 15 a further duct 17 is coupled, which is controlled by a third valve 18 and is derived from a heat exchanger 19 provided for receiving, through an inlet duct 20, the water system water.

The inlet duct 20 is controlled by a fourth valve 21 for controlling the delivery of the system water.

To the basin hot water inlet duct 10 there is coupled a water recirculation duct 25, coming from a heat exchanger 26 and provided for recirculating water during the cooking steps, at the desired temperature.

In the recirculation duct 25, upstream from the heat exchanger 20, there is provided a further solenoid valve 27 arranged on the delivery side of a second pump 28 communicating with the bottom of the basin 1.

To the delivery duct of the second pump 28 there is coupled a discharging duct 30, controlled by a sixth valve 31, as well as a recovery duct 32, controlled by a seventh valve 33 which supplies with hot water, coming from the basin 1, an accumulation tank 34 at the outlet of which there is provided a further valve 35 controlling its communication with a thermal exchange third pump 36 introducing the water exiting the basin 1 into the heat exchanger 19 in order to preheat the water to be supplied to the boiler.

The apparatus further comprises a duct 40 controlled by a ninth valve 41 which operates for introducing cold water into the basin 1.

In the operation of the apparatus, the valve 21 is opened at the start so as to introduce the desired water amount into the boiler 13, in which a closure float member is provided.

As the apparatus is turned on, the basket 2, which is arranged in a withdrawn position, is located, through the geared motor unit 6, in its loading position, that is with its opening upwardly directed, this loading position being defined by suitable limit switches.

Then the first pump is energized and the valve 15 is opened for recirculating water through the boiler 13, in which it is heated by the kettle 14 to a temperature of about 90° C.

After having obtained this temperature, the apparatus will be ready for carrying out the pasta cooking cycles.

To this end, pasta and salt are introduced into the basekt 2 and, after having set the cooking time, by means of a suitable push-button the cover 3 is closed which tightly engages the basin 1.

In order to start the cooking cycle, the valve 11 is opened for introducing hot water into the cooking basin 1, to a given level, which is controlled by a suitable floating member.

As the desired level is obtained, the valve 16 is opened and the valve 11 closed so that the water supplied by the pump 12 is recirculated through the boiler.

In the same time, the valve 27 arranged downsream of the heat exchanger 26 is opened to hold the hot water in the basin in a recirculation condition, through the second pump 28, at a controlled temperature from 90° to 98° C.

At the expiring of the cooking time, which is set by the timer, the valve 27 is closed and the valve 33 opened to introduce water into the accumulating tank 34.

After having evacuated the cooking tank, which requires from about 15 to 25 seconds, the valve 33 is closed and the valve 41 is opened for a given time, in order to introduce cold water into the basin to stop the pasta cooking operation.

Then the discharging valve 31 is opened to discharge the cold water which is ejected to the outside, and the second pump 28 is stopped.

Simultaneously with the closing of the valve 33 of the accumulating tank, the valve 35 is opened to introduce water from the accumulating tank, through the pump 36, into the thermal exchanger in order to preheat the water coming from the water system, by opening the valve 21 and valve 18, so as to supply with water the kettle 14.

As the discharging of water from the accumulating tank ends, by means of a water flow sensor, there are closed the valve 35 as well as the valve 21 and valve 18 and the pump 12 is operated which, by recirculating the water, heats it to the desired temperature.

At the completion of the cooking cycle, the cover 3 on the basin 1 is opened and the basket 2 is withdrawn from one side of the basin 1 and then the geared motor unit 6 is operated in order to tilt the basket and discharge the cooked pasta.

After having discharged the cooked pasta, the basket is turned to its starting position, and the apparatus will be ready for a new cooking cycle, upon filling therein the suitable amounts of pasta and salt.

From the foregoing disclosure it should be apparent that, for each cooking cycle, the cooking water is completely renewed, which will afford the possibility of adding the proper salt amount and moreover of cooking pasta in water which is free of soluble substances dissolved during the previous cooking operations.

An important aspect of the invention is moreover constituted by the fact that the inventive apparatus affords the possibility of recovering a great portion of the thermal power of the cooking water, since the water is delivered to the accumulating tank and sent to the heat exchanger for preheating the cold water to be introduced into the boiler 13.

Another important aspect of the invention is that it carries out in a completely automatic manner all of the cooking steps with a proper cooking of the pasta, since, as the desired cooking rate is obtained, it is contacted by cold water.

While the invention has been disclosed with reference to a preferred embodiment thereof, it should be apparent that it is susceptible to several modifications and variations all coming within the scope of the appended claims.

We claim:

1. An apparatus for automatically cooking pasta, comprising a basin in which a pasta basket is removably housed, said pasta basket being rotatably supported by a cover adapted to be tightly engaged on a side of said basin, a duct for introducing hot water into said basin, said hot water introducing duct being controlled by a first valve arranged on a delivery side of a first pump drawing water from a boiler, a water recirculation duct connected to said delivery side of said first pump and controlled by a second valve for recirculating water between a kettle and said boiler, a further duct connected to said kettle and controlled by a third valve for supplying preheated water from a heat exchanger to said kettle and said boiler, an accumulating tank for introducing the water existing the basin into the heat exchanger, and a basin recirculating circuit consisting of a second pump and a further heat exchanger.

* * * * *